(12) United States Patent　　(10) Patent No.:　　US 6,304,872 B1
Chao　　(45) Date of Patent:　　Oct. 16, 2001

(54) SEARCH SYSTEM FOR PROVIDING FULLTEXT SEARCH OVER WEB PAGES OF WORLD WIDE WEB SERVERS

(75) Inventor: Kuo-Jen Chao, Yung-Kang (TW)

(73) Assignee: Tornado Technology Co. Ltd., Taipei (TW)

( * ) Notice: Subject to any disclaimer, the term of this patent is extended or adjusted under 35 U.S.C. 154(b) by 0 days.

(21) Appl. No.: 09/133,674

(22) Filed: Aug. 13, 1998

(51) Int. Cl.$^7$ ...................................................... G06F 17/30
(52) U.S. Cl. ...................................................... 707/5; 707/3
(58) Field of Search .................................................. 707/1–6

(56) References Cited

U.S. PATENT DOCUMENTS

| | | | | |
|---|---|---|---|---|
| 5,742,816 | * | 4/1998 | Barr et al. | 395/615 |
| 5,845,273 | * | 12/1998 | Jindal | 707/1 |
| 5,848,410 | * | 12/1998 | Walls et al. | 707/4 |
| 5,873,076 | * | 2/1999 | Barr et al. | 707/3 |
| 5,899,995 | * | 5/1999 | Millier et al. | 707/102 |
| 5,905,862 | * | 5/1999 | Hoekstra | 395/200 |
| 5,913,208 | * | 6/1999 | Brown et al. | 707/3 |
| 5,913,209 | * | 6/1999 | Millett | 707/3 |
| 5,978,833 | * | 11/1999 | Pashley et al. | 709/200 |
| 5,991,756 | * | 11/1999 | Wu | 707/3 |
| 5,992,737 | * | 11/1999 | Kubota | 235/380 |
| 6,055,538 | * | 4/2000 | Kessenich et al. | 707/101 |

OTHER PUBLICATIONS

Computer Dictionary, 1997, Microsoft Press, Third Edition, p. 211.*

* cited by examiner

*Primary Examiner*—Thomas Black
*Assistant Examiner*—Mary Wang
(74) *Attorney, Agent, or Firm*—Winston Hsu

(57) ABSTRACT

The present invention provides a search system for providing fulltext search over web pages of world wide web servers which can save memory by storing only text, path and hyperlink data of a web page and excluding extraneous data. The system comprises a server connected to an internet, a plurality of data groups with web page data, and a management program. One user can input search parameter such as keywords into the search system over which the management program uses the search parameters to find matching web pages using an index file within the data groups, generates path data for the matched web pages and outputs the path and text data in a standard http format. The search system retrieve only text and path data of each web page and leaves out extraneous data so that the memory space of the server can be saved.

12 Claims, 3 Drawing Sheets

SEARCH SYSTEM FOR PROVIDING FULLTEXT SEARCH OVER WEB PAGES OF WORLD WIDE WEB SERVERS

BACKGROUND OF THE INVENTION

1. Field of the Invention

The present invention relates to a search system, and more particularly, to a search system for providing fulltext search over web pages of world wide web servers.

2. Description of the Prior Art

The internet has become extremely popular with more and more web servers connecting to it. This enables users to connect with the internet to search a wealth of information. Unfortunately, the vast number of servers currently connected with the internet as well as the number of web pages stored in each server has become unmanageably large thus confusing the user. To overcome this problem, many web page search systems have been produced. Users may key in desired information into the search systems to search servers and web pages.

To create a database for web pages stored in world wide web servers, the search systems analyze and process data contained in collected web pages from the web servers for use in the search. A single web page may contain many types of files including graphs, text, sound, motion files, etc. Additionally, each web server may contain hundreds, thousands, even tens of thousands, of web pages. Creating a database for even a single web server would be an overwhelming task and the problem is compounded when one considers the fact that a search system must handle hundreds of web servers simultaneously. Clearly, this enormous amount of needed computer memory and increased processing time is unacceptable.

SUMMARY OF THE INVENTION

It is therefore a primary objective of the present invention to provide a search system that creates its database by storing the text, path and hyperlink data of a web page only and excluding all extraneous data to solve the above problems.

In a preferred embodiment, the present invention provides a search system which comprises an internet server connected to the internet, a plurality of data groups stored in the server with each of the data groups comprising data from web pages of one world wide web server connected to the internet, and a management program stored in the server for managing operations of the server and providing users with the fulltext search service over the data groups. Each of the data groups in the server comprises a path file for recording path data of each of the web pages in the world wide web server corresponding to the data group and an index file for providing fulltext search for text data contained in the web pages of the world wide web server corresponding to the data group. The management program uses the index file of each data group to find web pages of the corresponding world wide web server which fit the specified search parameter, uses the path file of each data group to find the path data of each of the web pages of the corresponding world wide web server which fit the specified search parameter, and then outputs the result in a predetermined format.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
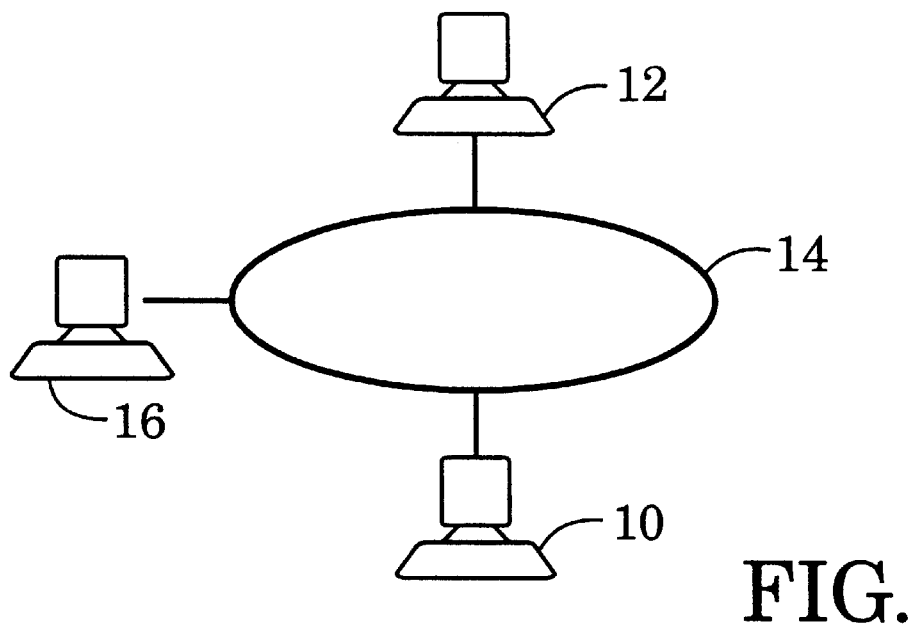
FIG. 1 is a schematic diagram of a search system for fulltext search web pages of world wide web servers according to the present invention.

Please refer to FIG. 1. FIG. 1 is a schematic diagram of the search system 10 for fulltext search of web pages on world wide web servers according to the present invention. Through the internet 14, the search system 10 can connect to the world wide web server 12 and a user 16. The web server 12 usually comprises a home page and a plurality of web pages for the user to search. To create a database, the search system 10 retrieves web page data of the web server 12 and stores only text and path data. This method saves time and memory.

Figure 2:
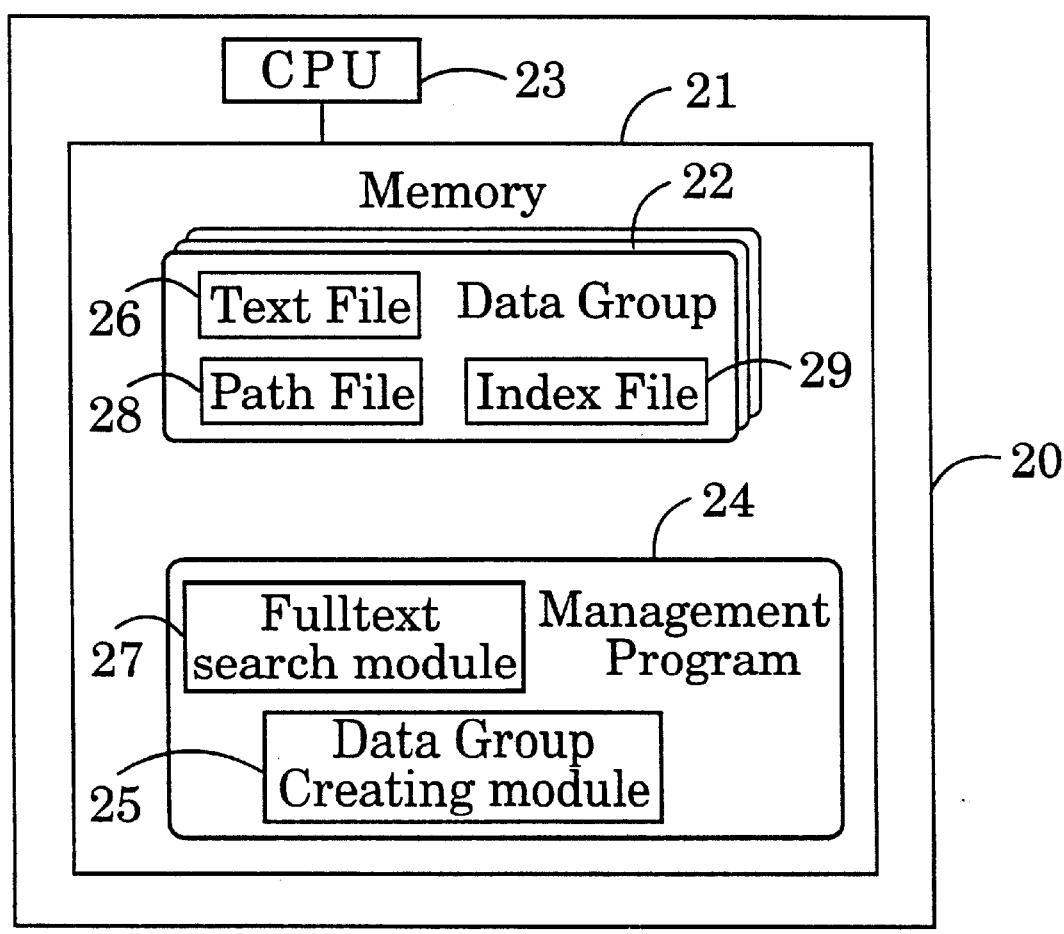
FIG. 2 is a functional block diagram of the search system shown in FIG. 1.

Please refer to FIG. 2. FIG. 2 is a functional block diagram of the search system 10 shown in FIG. 1. The search system 10 comprises a server 20 connected to the internet 14, a plurality of data groups 22, and a management program 24 stored in the server 20. The server 20 comprises a memory 21 for storing programs and data, and a CPU 23 for executing the program stored in the memory 21. The management program 24 manages the operation of the server 20 and comprises a data group creating module 25 for creating the data groups 22 within the world wide web server 12, and a fulltext search module 27 used by the data groups 22 to perform the fulltext search. Each of the data groups 22 contains data of web pages in a single world wide web server 12, and comprises a text file 26 for recording the text data within the web pages stored in the web server 12, a path file 28 for recording the path of the web pages, and an index file 30 for fulltext search of the text data of the web pages.

The data group creating module 25 creates the data groups 22 of each web server 12 connected to the internet. The data groups 22 provide fulltext search capability to the user 16. Data groups 22 are made by the data group creating module 25 which first connects to the web server 12 through the internet 14, then uses the text data and path data within each web page to create the text file 26, path file 28, and index file 30. These constitute the data groups 22 of the web server 12.

The fulltext search module 27 is used for fulltext search of the data groups 22. To search the web pages of the web server 12, the user inputs a keyword or a combination of keywords. Based on this information, the fulltext search module 27 uses the index file 30 to search the text file 26 in each of the data groups 22 for appropriate web pages. Finally, the fulltext search module 27 outputs the text data and path data of the appropriate web pages from the text file 26 and the path file 28 in a standard http web page format. The path file 28 contains the address of the web server 12 and the paths of the web pages whose text data is in the corresponding text file 26.

Figure 3:
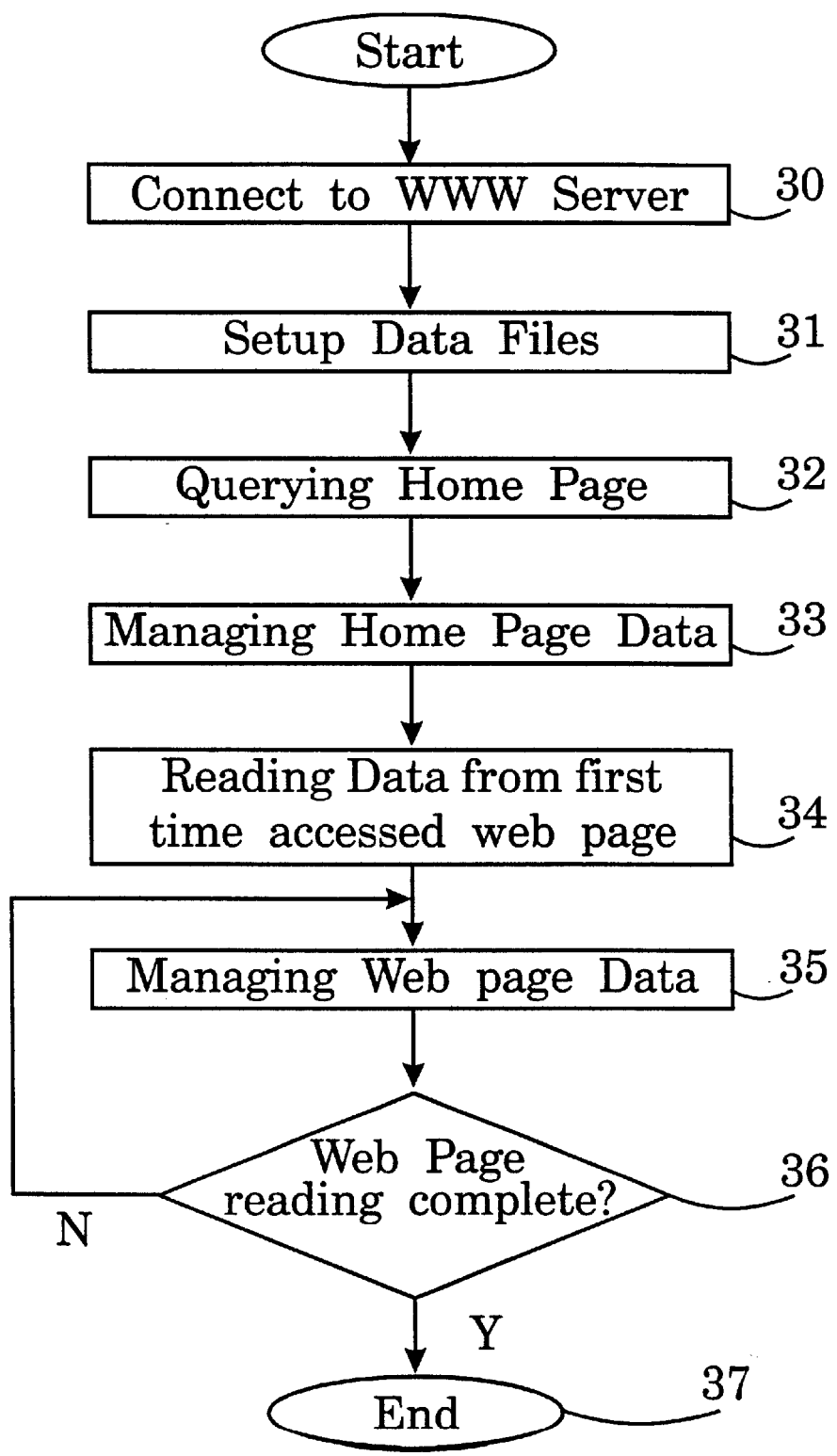
FIG. 3 shows a flowchart for creating a database for a web server by the search system shown in FIG. 1.

Please refer to FIG. 3. FIG. 3 shows a flowchart for creating the database for the web server 12 by the data group creating module 25 of the search system 10 shown in FIG. 1. The flowchart comprises following steps:

step30: connecting to the world wide web server 12 through the internet 14;

step31: creating the text file 26, the path file 28 for the web server 12 and a hyperlink data file, then storing the address of the web server 12 into the path file 28;

step32: requesting the home page of the web server 12;

step33: storing the text data of the home page into the text file 26, storing the path data into the path file 28, storing the hyperlinks into the hyperlink file, creating the index file 30 based on the text data stored in the text file 26, and abandoning all extraneous data in the home page;

step34: using a web page hyperlink from a previously unaccessed hyperlink file to request data from a web page in the web server 12;

step35: storing the text data of the web page into the text file 26, storing the path data into the path file 28, verifying the presence of the hyperlinks not yet stored in the web page and storing them into the hyperlink file, creating the index file 30 based on the text data stored in the text file 26, and then abandoning extraneous data within the web page;

step36: checking if all web pages stored in the hyperlink file are accessed; if not, go back to step 34;

step37: end.

Using the above procedure, the data group creating module 25 sequentially accesses all web pages in the web server 12 or all or a set number of web pages in a predetermined tree structure, stores text and path data of each web page into the text and path files 26 and 28, respectively, and ignores all extraneous data. This method allows the search system 10 to create data groups 22 efficiently while saving memory space.

Figure 4:
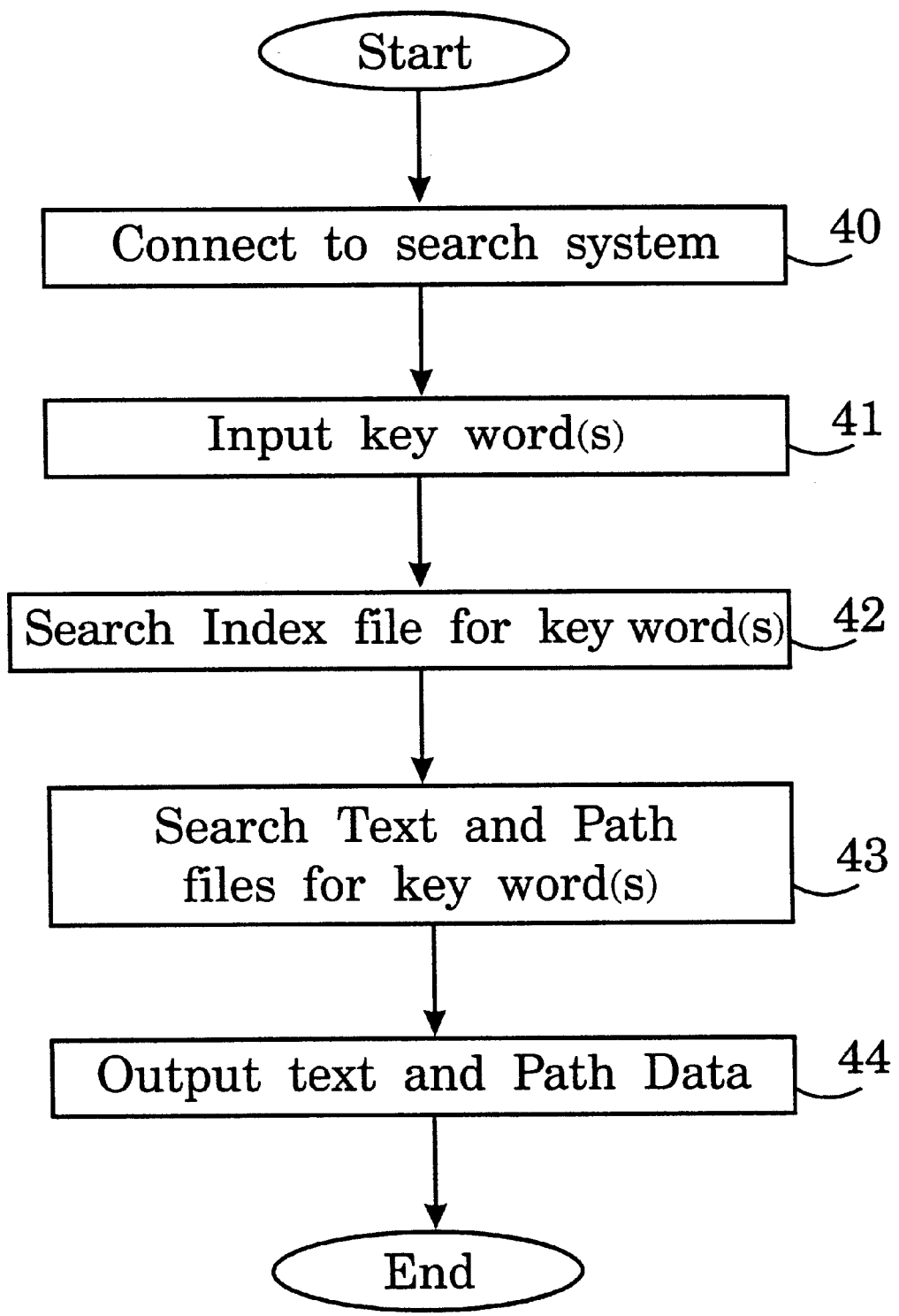
FIG. 4 is a flowchart for fulltext search executed by the search system shown in FIG. 1.

Please refer to FIG. 4. FIG. 4 is a flowchart showing the fulltext search process by the fulltext search module 27 within the search system 10. The procedure comprises the following steps:

step40: connecting to the search system 10 through the internet 14;

step41: inputting a keyword into the search system 10;

step42: searching the index file 30 of each data group 22 for the corresponding index data based on the keyword;

step43: searching the text file 26 and path file 28 of each data group 22 for corresponding text and path data based on index data corresponding to the keyword;

step44: combining the text and path data, then outputting the data.

In step 44, the fulltext search module 27, rather than outputting the full text data, outputs the title or a portion of the text data of each web page according to the input command from the user. This output data is arranged in a sequence and format in accordance with the http standard. Since the path data of the searched web pages are stored in each outputted web page in the form of hyperlinks, the user 16 may use hyperlinks to locate the original web server containing the desired web pages.

When prior art search systems create databases for world wide web servers, the entire web page is often loaded before analyzing and organizing data within the web pages and producing the index data. This process requires a lot of computer memory and processing time. Conversely, the fulltext search system 10 of the present invention saves memory and processing time by storing the text and path data in the web pages of the web server 12 and abandoning extraneous data.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A search system for providing fulltext search of web pages of world wide web servers connected to an internet, the search system comprising:

an internet server connected to the internet;

a plurality of data groups stored in the server, each of the data groups comprising data from web pages of one world wide web server connected to the internet; and a management program stored in the server for managing operations of the server and providing users with the fulltext search service over the data groups, the management program comprising a data group creating module for creating the data group of each of the world wide web servers for fulltext search;

wherein each of the data groups in the server comprises:
 a text file for recording the text data contained in each of the web pages of the corresponding world wide web server;
 a path file for recording path data of each of the web pages contained in the text file of the same data group; and
 an index file for providing fulltext search for text data contained in the text file of the same data group;

wherein according to at least one user specified search parameter, the management program uses the index file of each data group to search the text file of the same data group to find web pages of the corresponding world wide web server which fit the specified search parameter, uses the text file of the same data group to retrieve text data of each web page which fits the search parameter, uses the path file of the same data group to find the path data of each of the web pages of the corresponding world wide web server which fit the specified search parameter, and then outputs the result in a predetermined format, and when creating one data group for a world wide web server, the data group creating module first connects to the world wide web server through the internet, retrieves text and path data stored in the web pages of the world wide web server, creates one text file and one path file using the retrieved data, and then creates one index file using the text file for fulltext search of the text data contained in the text file, and after retrieving the text data and path data contained in each of the web pages, the management program abandons all the other data to save memory space.

2. The search system of claim 1 wherein the management program outputs the text data and path data of the web pages which fit the specified search parameter in accordance with the http standard web page format.

3. The search system of claim 1 wherein the management program outputs a title portion or part of the text data contained in the web pages which fit the specified search parameter.

4. The search system of claim 1 wherein the search parameter is a keyword or a combination of keywords.

5. The search system of claim 1 wherein the path file of each data group comprises internal paths of all the web pages of the corresponding world wide web server and the internet address of the world wide web server on the internet, and wherein the internal paths and the internet address are included in the path data outputted by the management program.

6. A method for creating a data group for a world wide web server connected to an internet in a full text search system, the search system comprising:

an internet server connected to the internet for storing the data group of the world wide web server; and a management program stored in the server for managing operations of the server and creating the data group of the world wide web server;

the data group of the world wide web server comprising:

a text file for recording the text data contained in web pages of the world wide web server;

a path file for recording path data of each of the web pages in the text file of the data group; and an index file for providing fulltext search for the text data contained in the text file of the data group;

the method of creating the data group comprising:

connecting the server with the world wide web server through the internet;

retrieving text data from each of the web pages of the world wide web server to create the text file;

retrieving path data from each of the web pages of the world wide web server to create the path file;

using text data contained in each of the web pages of the world wide web server to create the index file for providing fulltext search over the text data of the web pages in the world wide web server; and after retrieving the text data and path data contained in each of the web pages, the management program abandoning all the other data to save memory space.

7. The method of claim 6 wherein when retrieving the text data and path data contained in each of the web pages, the management program can retrieve the data from all the web pages, a predetermined number of web pages, or all of the web pages in a predetermined tree structure from the world wide web server.

8. A search system for providing full text search of web pages of world wide web servers connected to an internet, the search system comprising:

an internet server connected to the internet;

a text file for recording the text data contained in each of the web pages;

a path file for recording path data of each of the web pages contained in the text file;

an index file for providing fulltext search for the text data contained in the text file; and a management program stored on the server for managing operations of the server and using the path file and the index file to provide users with the fulltext search service, the management program comprising a data creation module for creating the path file, the index file and the text file for fulltext search;

wherein according to at least one user specified search parameter, the management program uses the index file of each data group to search the text file to find web pages of a world wide web server which fit the specified search parameter, uses the path file of each data group to find the path data of each of the web pages of the corresponding world wide web server which fit the specified search parameter, and then outputs the result in a predetermined format, and when creating data for a world wide web server, the data creation module first connects to the world wide web server through the internet, retrieves text and path data stored in the web pages of the world wide web server, creates one text file and one path file using the retrieved data, and then creates one index file using the text file for fulltext search of the text data contained in the text file, and after retrieving the text data and path data contained in each of the web pages, the management program abandons all the other data to save memory space.

9. The search system of claim 8 wherein the management program outputs the text data and path data of the web pages which fit the specified search parameter in accordance with the http standard web page format.

10. The search system of claim 8 wherein the management program outputs a title portion or part of the text data contained in the web pages which fit the specified search parameter.

11. The search system of claim 8 wherein the search parameter is a keyword or a combination of keywords.

12. The search system of claim 8 wherein the path file of each data group comprises internal paths of all the web pages of the corresponding world wide web server and the internet address of the world wide web server on the internet, and wherein the internal paths and the internet address are included in the path data outputted by the management program.

* * * * *